(12) United States Patent
Klein

(10) Patent No.: US 8,731,732 B2
(45) Date of Patent: May 20, 2014

(54) METHODS AND SYSTEM TO MANAGE VARIABILITY IN PRODUCTION OF RENEWABLE ENERGY

(75) Inventor: Stanley Klein, Rockville, MD (US)

(73) Assignee: Stanley Klein, Rockville, MD (US)

( * ) Notice: Subject to any disclaimer, the term of this patent is extended or adjusted under 35 U.S.C. 154(b) by 71 days.

(21) Appl. No.: 12/391,356

(22) Filed: Feb. 24, 2009

(65) Prior Publication Data
US 2009/0216387 A1    Aug. 27, 2009

Related U.S. Application Data

(60) Provisional application No. 61/031,050, filed on Feb. 25, 2008.

(51) Int. Cl.
*G05D 11/00* (2006.01)

(52) U.S. Cl.
USPC .............................. 700/295; 700/286; 290/44

(58) Field of Classification Search
USPC .............................. 700/291, 295, 286; 290/44
See application file for complete search history.

(56) References Cited

U.S. PATENT DOCUMENTS

| | | | |
|---|---|---|---|
| 4,205,235 A | 5/1980 | Pal et al. | |
| 4,511,807 A | 4/1985 | Somerville | |
| 5,502,339 A | 3/1996 | Hartig | |
| 5,536,976 A | 7/1996 | Churchill | |
| 6,181,583 B1* | 1/2001 | Okui et al. | 363/45 |
| 6,503,649 B1* | 1/2003 | Czajkowski et al. | 429/430 |
| 6,512,966 B2* | 1/2003 | Lof et al. | 700/291 |
| 6,522,955 B1* | 2/2003 | Colborn | 700/286 |
| 6,542,791 B1* | 4/2003 | Perez | 700/295 |
| 6,670,721 B2* | 12/2003 | Lof et al. | 290/44 |
| 6,671,585 B2* | 12/2003 | Lof et al. | 705/36 R |
| 6,681,156 B1* | 1/2004 | Weiss | 700/291 |
| 6,701,298 B1* | 3/2004 | Jutsen | 705/7.39 |
| 6,718,213 B1 | 4/2004 | Enberg | |
| 6,889,122 B2* | 5/2005 | Perez | 700/295 |
| 6,902,837 B2* | 6/2005 | McCluskey et al. | 429/9 |
| 6,925,361 B1* | 8/2005 | Sinnock | 700/286 |
| 7,006,898 B2* | 2/2006 | Barbir et al. | 700/286 |
| 7,013,203 B2 | 3/2006 | Moore et al. | |
| 7,062,360 B2* | 6/2006 | Fairlie et al. | 700/286 |

(Continued)

OTHER PUBLICATIONS

Klein, Stanley A., "Accommodating Wind Power Variability by Real-Time Adjustment of Controllable Loads", IEEE Power and Energy Society General Meeting—Conversion and Delivery of Electrical Energy in the 21st Century, Pittsburgh, PA, Jul. 20-24, 2008, pp. 1-5.

*Primary Examiner* — Mohammad Ali
*Assistant Examiner* — Anthony Whittington
(74) *Attorney, Agent, or Firm* — Garrett IP, L.L.C.

(57) ABSTRACT

Methods and systems to control loads coupled to an electric energy or power grid within corresponding ranges of load values in response to one or more factors, such as to manage variability in production of renewable energy. Loads may be controlled in response to an indication of balance between available power and loads and/or in response to new loads and/or grid disconnections, and may be controlled repeatedly over time to adjust a sum load in response to changes in one or more of balance between available power and loads, new loads, and grid disconnections. A load may be repeatedly adjusted over time to provide an electrical power requirement within a time frame while accommodating at least a portion of variations in the balance between available electric power and load.

24 Claims, 8 Drawing Sheets

(56) References Cited

U.S. PATENT DOCUMENTS

| | | |
|---|---|---|
| 7,069,117 B2 * | 6/2006 | Wilson et al. ............... 700/295 |
| 7,099,800 B2 | 8/2006 | Henriksen et al. |
| 7,171,287 B2 * | 1/2007 | Weiss ......................... 700/291 |
| 7,177,728 B2 | 2/2007 | Gardner |
| 7,181,316 B2 * | 2/2007 | Fairlie et al. ................ 700/266 |
| 7,197,378 B2 | 3/2007 | Sato et al. |
| 7,199,482 B2 * | 4/2007 | Hopewell .................... 290/44 |
| 7,239,035 B2 | 7/2007 | Garces et al. |
| 7,261,962 B1 * | 8/2007 | Czajkowski et al. ........ 429/423 |
| 7,315,769 B2 * | 1/2008 | Balan et al. ................. 700/286 |
| 7,406,364 B2 * | 7/2008 | Andren et al. .............. 700/286 |
| 7,424,343 B2 * | 9/2008 | Kates ........................... 700/276 |
| 7,430,534 B2 * | 9/2008 | Lof et al. ..................... 705/37 |
| 7,447,613 B2 * | 11/2008 | Mertins et al. ............... 703/1 |
| 2003/0006613 A1 * | 1/2003 | Lof et al. ..................... 290/44 |
| 2005/0033707 A1 | 2/2005 | Ehlers et al. |
| 2005/0077881 A1 | 4/2005 | Capp et al. |
| 2006/0031287 A1 * | 2/2006 | Ulrich et al. ................ 709/203 |
| 2006/0173956 A1 * | 8/2006 | Ulrich et al. ................ 709/203 |
| 2007/0038335 A1 | 2/2007 | McIntyre et al. |
| 2007/0100503 A1 | 5/2007 | Balan et al. |
| 2007/0138792 A1 | 6/2007 | Liu et al. |

\* cited by examiner

METHODS AND SYSTEM TO MANAGE VARIABILITY IN PRODUCTION OF RENEWABLE ENERGY

CROSS REFERENCE TO RELATED APPLICATIONS

This patent application claims the benefit of U.S. Provisional Application Ser. No. 61/031,050, titled, "Methods and Systems for Managing Variability in Production of Renewable Energy," filed Feb. 25, 2008, which is incorporated herein by reference in its entirety.

BACKGROUND

In an electric power grid that uses conventional generation technology (e.g., oil-fired, gas-fired, nuclear, hydro) production of electric power is varied to match consumption. Some power plants are base-loaded (i.e., are set to produce constant output) and others have their output controlled to satisfy changing load requirements. There are multiple time horizons over which the power plant production is controlled to balance production against the load on the grid. The shortest time horizon ranging between a few seconds to a few minutes, is focused on maintaining system frequency, and is called regulation. A longer time horizon ranging between a few minutes to a few hours, is focused on balancing supply and demand, and is called load following.

One of the issues with renewable power grid integration is the variability of power production. Conventional methods of addressing this issue include (1) changing the production of conventional, grid-connected power plants in real-time to compensate for the changes in renewable power production, and (2) curtailing the renewable power production below its potential maximum to maintain a pre-scheduled value that can be expected to be maintained based on forecasts. The first approach requires increased use of conventional production and increased variation of that production to compensate for the variability of renewable power production. The second approach foregoes potential renewable power production to provide a lower guaranteed level of output Some approaches that control loads to assist the grid in load following have been forms of curtailment, including: a) interruptible loads, in which a load such as a manufacturing plant disconnects from the grid and runs on its own power during periods when the grid is stressed, or b) demand management, that includes a variety of strategies in which grid customers are economically induced, generally during periods of peak load on the grid, to either (i) allow specified loads be inhibited by centralized control from operating for specified durations, or (ii) to generally avoid use of appliances or other high power consumption items during those peak periods.

SUMMARY

Disclosed herein are methods and systems to control loads coupled to an electric energy or power grid within corresponding ranges of load values. The ranges of load values may include a plurality of discrete set points and/or continuous ranges, and may be defined by minimum and maximum load or task capacity values.

The loads may be controlled within the corresponding ranges of load values in response to one or more factors. For example, the loads may be controlled in response to an indication of available power, and may be controlled repeatedly over time to adjust a sum load in response to changes in the available power.

The loads may be controlled to manage variability in electrical energy or power generation, such as where electrical power is generated from one or more renewable energy sources, such as wind, solar, tidal, and geothermal sources.

The loads may be controlled in response to new loads and/or grid disconnections.

A load may be associated with one or more tasks, which may include an electrical energy requirement and a corresponding time frame to receive the electrical energy requirement. Such a load may be controlled within a corresponding range of load values to provide the electrical energy requirement within the time frame, while also accommodating at least a portion of variations in the balance between available electric power and load.

BRIEF DESCRIPTION OF THE DRAWINGS/FIGURES

Figure 1:
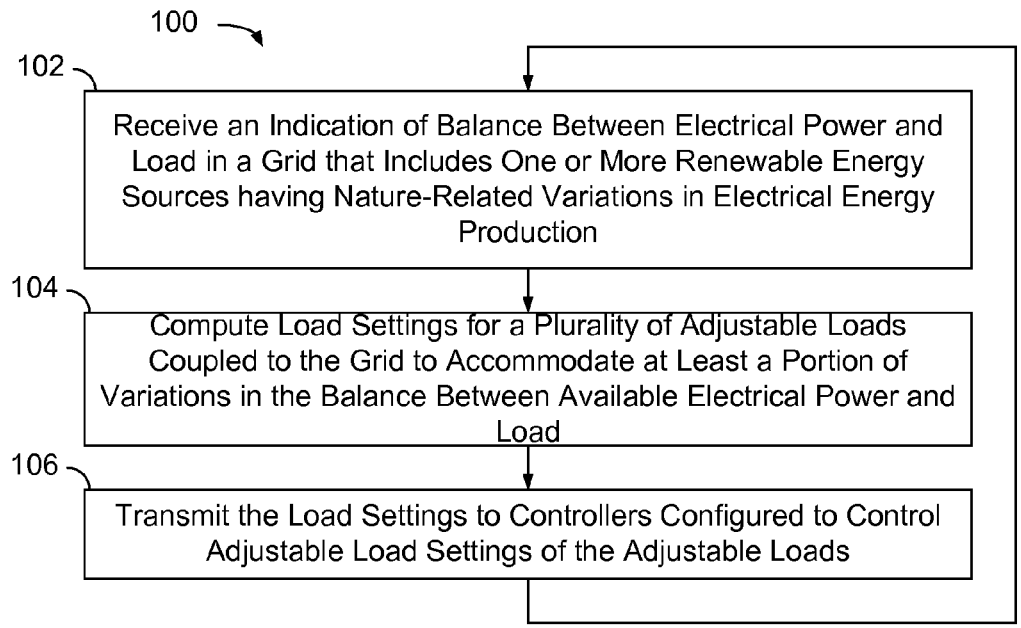
FIG. 1 is process flowchart of an exemplary method of controlling load settings.

In the drawings, the leftmost digit(s) of a reference number identifies the drawing in which the reference number first appears.

DETAILED DESCRIPTION

Disclosed herein are methods and systems to control loads coupled to an electric power grid with corresponding ranges of load values. The electrical power grid may include one or more renewable energy based generators having nature-related variations in electrical energy generating capacity. Loads may be controlled in response one or more of a variety of factors including, without limitation, variations of available electrical energy, variations in a grid loading, and financial considerations.

FIG. 1 is process flowchart of an exemplary method 100 of controlling loads.

At 102, an indication of balance between available electric power and load is received, which may correspond to one or more renewable energy sources having nature-related variations in electrical energy production. The indication of balance may include an indication of a change in balance relative to a prior instance of 102.

At 104, one or more load settings are determined or computed for one or more controllable loads coupled to the grid. The one or more load settings may be computed to accommodate at least a portion of variations in the balance between available electric power and load.

For example, when a sum load is less than the available energy, the system frequency may increase slightly. When the sum load is greater than the available energy, the system frequency may decrease slightly. NERC BAL standards specify how closely the system frequency needs to be to the nominal 60 Hz, and over what periods of time it needs to be averaged and corrected.

The one or more load settings may be adjusted repeatedly over time to provide a load with a corresponding load requirement within a corresponding time requirement. For example, a controllable load may be controlled to present a relatively low load value during a first period of time, such as to accommodate needs of other loads in view of the indication of balance between available electric power and loads. The controllable load may be subsequently controlled to present a higher load value during a second period of time to insure that controllable load receives a corresponding electrical energy requirement within an allotted time period.

Load settings may be determined with respect to one or more time horizons to accommodate regulation and load balancing.

At 106, the one or more load settings are communicated to the one or more controllable loads and/or to load controllers associated with the controllable loads.

The receiving of an indication of balance between available electrical energy and load at 102, the computing of load settings at 104, and the communicating of the load settings at 106, may be repeated to adjust a portion of the balance between the available electrical energy and load and/or to account for subsequently connected loads and/or subsequently disconnected loads.

One or more of the receiving the indication of balance between available electrical energy and load at 102, the computing of load settings at 104, and the communicating of the load settings at 106, or portions thereof, may be performed in real time, continuously, at discrete times, at times consisting of the sum of a specified time and a random increment or decrement, according to a schedule, and combinations thereof.

One or more of the receiving the indication of balance between available electrical energy and load at 102, the computing of load settings at 104, and the communicating of the load settings at 106, may be performed with respect to one or more time horizons.

One or more of the computing load settings at 104 and the communicating of the load settings at 106 may be performed with respect to subsets of controllable loads.

Method 100, or portions thereof, may be implemented alone and/or in various combinations with one or more other features disclosed herein.

Figure 2:
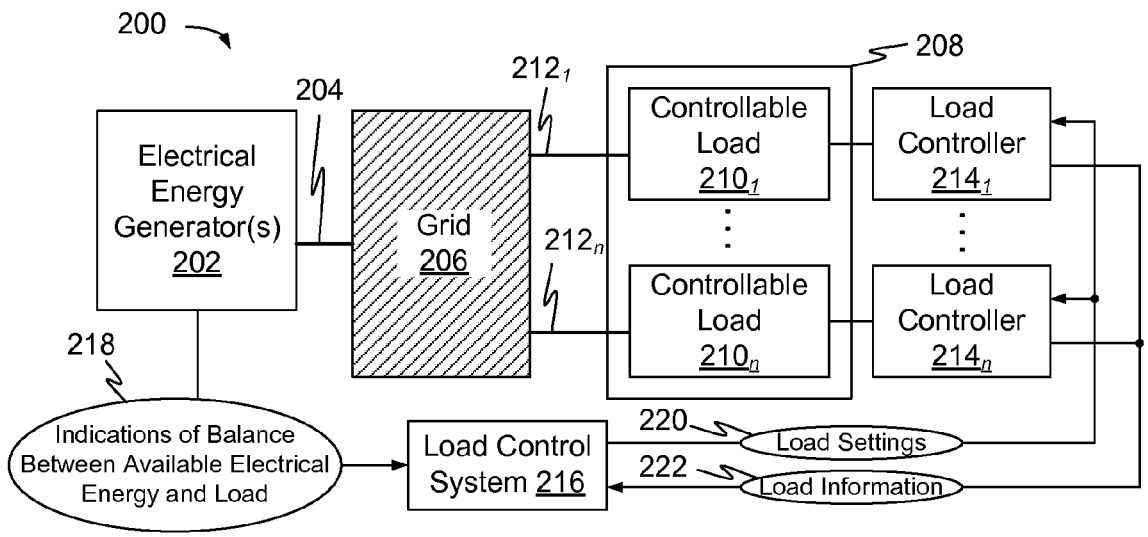
FIG. 2 is a block diagram of an exemplary electrical energy environment, including a load control system.

FIG. 2 is a block diagram of an exemplary electrical energy environment 200, including one or more electrical energy generators 202 to provide electrical energy 204 to an electrical energy grid 206.

The one or more electrical energy generators 202 may include one or more energy generators that are subject to variations in electrical energy production or generating capacity. The one or more electrical energy generators 202 may include one or more renewable electrical energy generators that may be subject to nature-related or nature-induced variations in electrical energy production or generating capacity. The one or more electrical energy generators 202 may include, for example and without limitation, one or more of a wind powered electrical energy generator, a solar powered electrical energy generator, and a tidal powered electrical energy generator. The one or more electrical energy generators 202 may include one or more conventional electrical energy generators.

Environment 200 further includes a plurality of loads 208, including one or more controllable loads $210_1$ through $210_n$, to receive electrical energy $212_1$ through $212_n$, from grid 206. Loads 208 may include a combination of controllable loads 210 and fixed or variable but uncontrollable loads. For example, a load may be fixed in location and may be fixed in power draw or variable in power draw.

Environment 200 may include one or more load controllers $214_1$ through $214_n$, to control one or more corresponding controllable loads $210_1$ through $210_n$. One or more of load controllers $214_1$ through $214_n$, may be configured to control a plurality of controllable loads 210. A load controller 214 may be programmable with respect to one or more load controller features disclosed herein. A load controller 214 may be integrated within a corresponding controllable load 210. A load controller 214 may be configured to control a corresponding controllable load 210 over one or more of wire, optic fiber, and wirelessly.

Environment 200 further includes a load control system 216 to receive indications 218 of balance between available electrical energy and load from the one or more electrical energy generators 202, to determine one or more load settings 220 for one or more controllable loads 210, and to communicate load settings 220 to one or more corresponding load controllers $214_1$ through $214_n$.

The indications 218 of the balance between available electrical energy and load may include one or more of: an indication of at least a portion of available electric power; an indication of at least a portion of the load; an indication of a system frequency; an indication of an effect of generation or load changes on the change in system frequency; an indication of an allocated portion of the balancing effort to be accommodated; an indication of an allocated amount of controllable load to be changed; an indication of an allocated amount of generation, the changes in which are to be balanced by changing the controllable loads; an indication of a subset of the available generation, the changes in which are to be balanced at least in part by changing the controllable loads; and an indication of a subset of the load, the changes in which are to be balanced at least in part by changing the controllable loads. As described further below, indications of the balance between available electrical energy and load may be received by load control system 216 from a variety of sources. For the particular case depicted in FIG. 2, the indications may be those appropriately supplied by the electrical energy generators 202.

One or more controllers 214 may be configured to provide load information 222 to load control system 216. Load information 222 may include one or more load parameters, which may include one or more task parameters.

Load control system 216 may be configured to determine one or more corresponding load settings in accordance with parameters of load information 222, to manage a sum load of grid 206 in view of indications 218 of balance between available electrical energy and load.

One or more controllable loads 210, load controllers 214, and load control system 216 may be configured in accordance with and/or to accommodate one or more of a variety of features and/or characteristics. Exemplary features and characteristics are described below.

A controllable load 210 may have a corresponding function that can accommodate external control.

A controllable load 210 may be controllable to continuously vary a load presented to a grid within a load range that corresponds to acceptable levels of performance with respect to a function for which the controllable load 210 consumes electricity.

A controllable load 210 may be configured to be controlled over a time or a range.

A controllable load 210 may be configured to be controlled continuously.

A controllable load 210 may be configured to be controlled in real time.

Load control system 216 and one or more controllable loads 210 and/or load controllers 214 may be configured to communicate with one another to provide real-time control of one or more controllable loads 210.

A controllable load 210 may be configured to communicate feasible range of load values to load control system 216.

Load control system 216 may be configured to calculate or determine one or more continuously variable set points within one or more corresponding ranges of load values for one or more controllable loads 210.

A controllable load 210 may be configured to receive a setpoint at which to operate within a corresponding load range, and to operate at that setpoint until receipt of a subsequent setpoint.

A controllable load 210 may be associated with a task having one or more of a variable load parameter, a time parameter, and a status parameter, such as a current completion value.

A controllable load 210 may be configured to communicate state or status information to load control system 216.

Load control system 216 may be configured to receive state or status information from one or more controllable loads 210.

A controllable load 210 may be configured to perform or complete a task for which it utilizes electricity, within a fraction or portion of time for which the load is coupled to a grid.

A controllable load 210 may include a rechargeable battery, which may be associated with a pluggable hybrid electric vehicle (PHEV).

A rechargeable battery, and/or a corresponding load controller 214 may be configured to vary a charging rate of the battery, such as with pulse-width-based electronic technology.

A rechargeable battery may be controllable between a minimum charge rate and a maximum charge rate. A time to charge the battery may vary depending on the charge rate. The battery may be plugged into a corresponding electric grid for a period of time, which may be greater than a charge time associated with the battery, and load control system 216 may be configured to control the charge rate to charge the battery within the period of time, while also accommodating at least a portion of variations in the balance 218 between available electric power 202 and load 208.

A controllable load 210 may be associated with a variable speed and/or variable rate electro-mechanical task, which may include controlling one or more of pressure, temperature, volume, and flow, such as with a heating, ventilation, and air conditioning (HVAC) system, which may correspond to a commercial building and/or industrial process and/or system. The electro-mechanical task may have a range of load values and may have a time range within which the task is to be performed and/or a total energy requirement is to be provided. Load control system 216 may be configured to control the load within the range of load values to accommodate the task, while also accommodating at least a portion of variations in the balance 218 between available electric power 202 and load 208.

One or more computing functions may be distributed or allocated amongst a plurality of systems. For example, one or more of a controllable load 210, a corresponding load controller 214, and load controller system 216, may be configured to calculate one or more load parameters, alone or in combination with one another.

For example, a controllable load 210 and/or a corresponding load controller 214 may be configured to determine and send minimum and maximum load, rate, or capacity values, $P_{min}$ and $P_{max}$, to load control system 216, and load control system 216 may be configured to calculate and send a set point within $P_{min}$ and $P_{max}$ to the load 210. The set point may be determined as a discrete value within $P_{min}$ and $P_{max}$, or as a percentage or fraction of a range between $P_{min}$ and $P_{max}$. For example, load control system 216 may be configured to determine and send a percentage or fractional value "d," and the corresponding load 210 or load controller 214 may be configured to determine the set point as $P_{min}+d*(P_{max}-P_{min})$.

Alternatively, or additionally, a controllable load 210 and/or a corresponding load controller 214 may be configured to send minimum and maximum capacity values, a current state of a task, and a time parameter to load control system 216, and load control system 216 may be configured to calculate corresponding minimum and maximum values, $P_{max}$ and $P_{min}$, from the minimum and maximum capacity values, the current state of the task, and the time parameter. Load control system 216 may be further configured to determine a setpoint within $P_{max}$ and $P_{min}$, such as described above, and to communicate the setpoint to the controllable load 210, or to communicate $P_{max}$ and $P_{min}$ and a percentage or fractional value "d", as described above.

In the example above, the time parameter may relate to a time remaining of a task performance period and/or a time within which a task is to be completed within a task performance period. A task performance period may correspond to a period over which a performance is determined. Where performance is measured with respect to an average rate, the performance period may correspond to a period over which the performance is averaged. Where the load 210 includes a rechargeable battery, the minimum capacity value may correspond to a relatively low charging rate of the battery, the maximum capacity limit may correspond to a maximum charging rate of the battery, the current state of the task may correspond to a current charge level of the battery, which may be a percentage value, and the time remaining may correspond to a time remaining until the battery is to be charged.

Functions and features disclosed herein may be implemented within one or more of a variety of systems and environments and/or distributed amongst a plurality of systems and environments. Exemplary distribution of a plurality functions is described below.

One or more instances of load control system 216 may be implemented as part of a load control center and/or distributed across multiple load control centers. Load control system 216 may be configured to communicate directly with one or more of a plurality of systems, and/or to communicate with one or more systems through one or more intermediary systems and/or networks. Load control system 216 may be configured to communicate with other systems and/or networks wirelessly and/or over one or more of wirelines, which may include one or more of wire, cable, and fiber optic lines.

Load control system 216 may be implemented as part of one or more control centers within an electrical energy generation and distribution environment, which may include one or more renewable and/or conventional electrical energy generators.

Load control system 216 may be implemented as part of a renewable power generation control center associated with renewable power generators, and the renewable power generation control center may be configured to interface and/or coordinate with a conventional power grid control center.

An exemplary environment may include a renewable power generator control center associated with one or more renewable power generators, a grid control center associated with a grid, and a load control center associated with controllable loads. The control centers may be configured to communicate and/or coordinate with one another. For example, the renewable power generator and the grid control center may be configured to communicate and/or coordinate with one another, and the grid control center and the load control center may be configured to communicate and/or coordinate with one another.

An exemplary environment may include a hierarchy of renewable power generator control centers, a hierarchy of grid control centers, and a hierarchy of load control centers, which may be configured to communicate and/or coordinate with one another. For example, the hierarchy of renewable power generators and the hierarchy of grid control centers may be configured to communicate and/or coordinate with one another, and the hierarchy of grid control centers and the hierarchy of load control centers may be configured to communicate and/or coordinate with one another.

An exemplary environment may include a hierarchy of renewable power generation control centers and a hierarchy of load control centers, each of which may be configured to communicate with a common grid control center.

One or more control centers may be operated by and/or on behalf of one or more of an electric power load serving entity, an aggregator of renewable power, a load aggregator, a balancing authority, a reliability coordinator, a transmission operator, an independent system operator, a conventional power generator owner, other market participants, and combinations thereof.

Exemplary environments are described below with respect to FIGS. 3 and 4.

Figure 3:
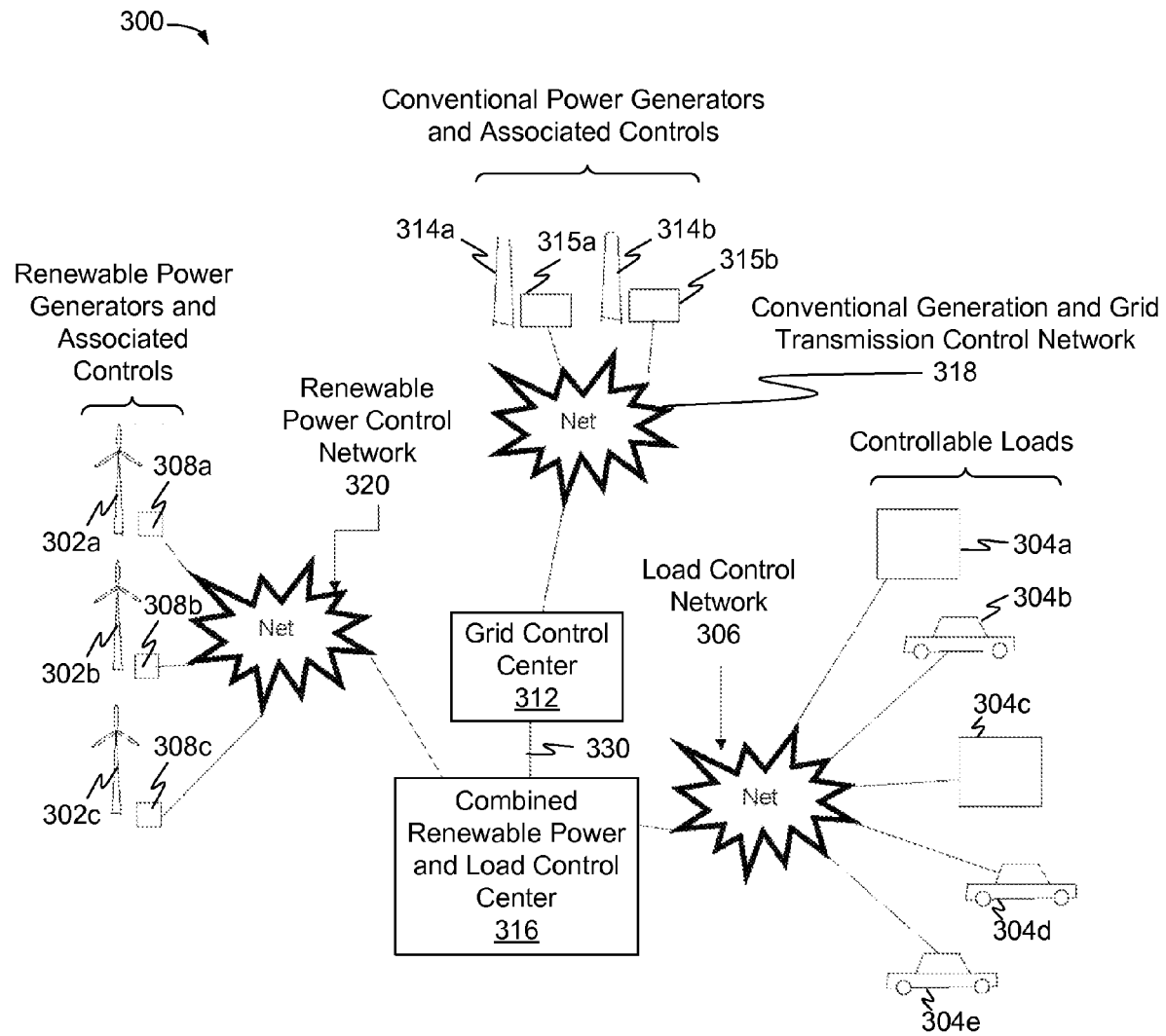
FIG. 3 is a block diagram of another exemplary electrical energy environment including a combined renewable power and load control center.

FIG. 3 is a block diagram of an exemplary environment 300, including a plurality of renewable power generators 302 and associated control systems 308, a plurality of conventional power generators 314 and associated control systems 315, and a plurality of controllable loads 304.

Environment 300 further includes a grid control center 312 to communicate with control systems 315 through a control network 318.

Environment 300 further includes a combined renewable power and load control center 316 to communicate with control systems 308 through a renewable power control network 316, and to communicate with controllable loads 304 through a load control network 306. Combined renewable power and load control center 316 may be configured to receive indications of available power from control systems 308 through network 316, and to compute and communicate load settings to controllable loads 304 through network 306. Combined renewable power and load control center 316 may be configured to receive load information from controllable loads 304 through network 306, and to use the received load information to compute the load settings.

Grid control center 312 and combined renewable power and load control center 316 may be configured to communicate and/or coordinate with one another over a link or network 330, such as to coordinate power generation, distribution, and loading.

Combined renewable power and load control center 316 may be configured to control controllable loads 304 in response to demand from loads other than controllable loads 304. For example, when such other demand is relatively high, control center 316 may control controllable loads 304 to reduce corresponding load settings. Conversely, when such other demand is relatively low, control center 316 may control controllable loads 304 to increase corresponding load settings. Control center 316 may be configured to control controllable loads 304 to increase loading beyond what may be accommodated by renewable power generators 302, such as when a cost associated with electrical power from conventional power generators 314 is relatively low. Such coordination may be implemented to generate financial revenue and/or other consideration on behalf of one or more entities associated with one or more features illustrated in FIG. 3.

One or more of grid control system 312 and combined renewable power and load control center 316, or portions thereof, may be integrated within a computer system, and/or may be distributed over multiple computer systems at one or more geographic locations, and may be owned and/or operated by a common entity and/or multiple entities.

Figure 4:
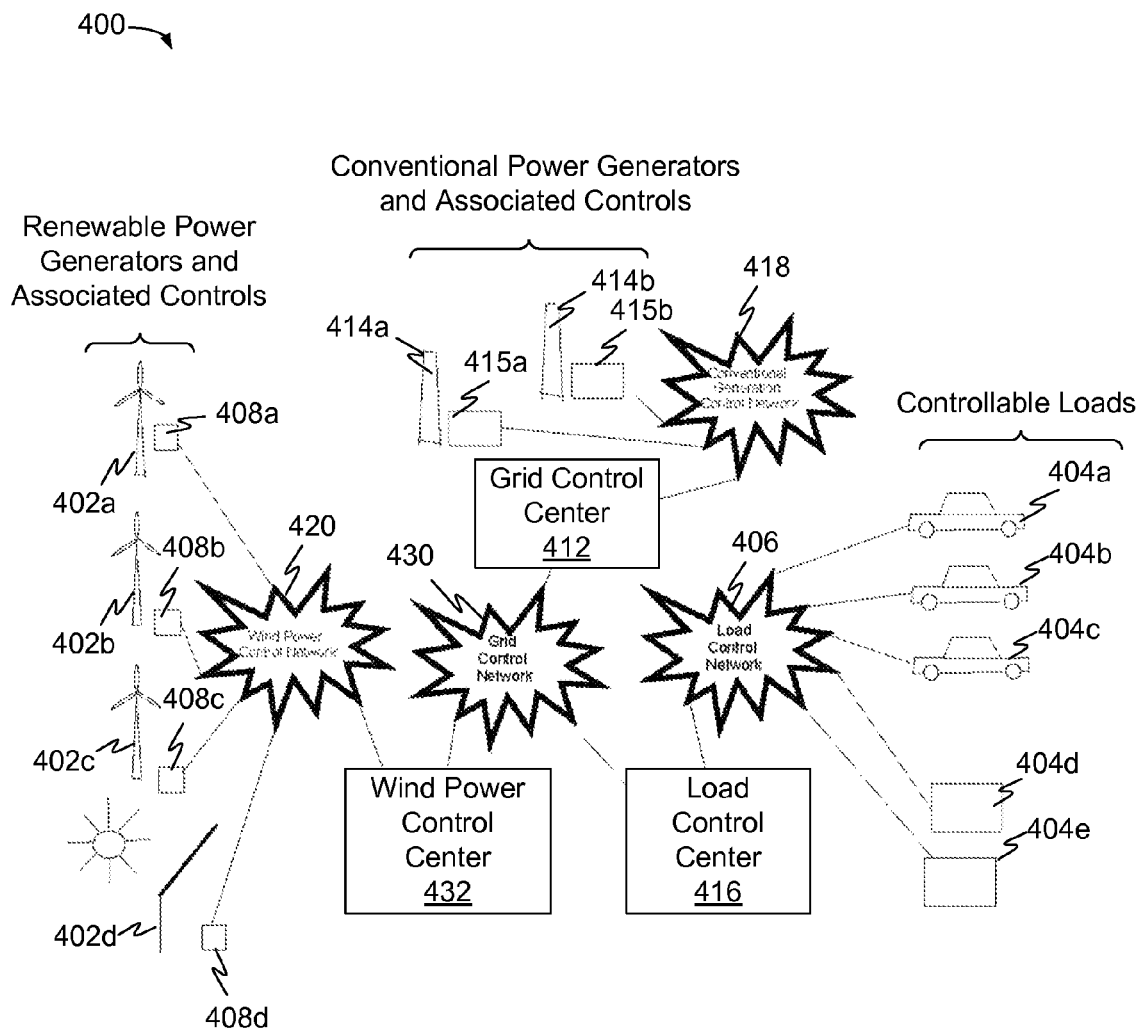
FIG. 4 is a block diagram of another exemplary electrical energy environment including a load control center.

FIG. 4 is a block diagram of an exemplary environment 400 including a plurality of renewable power generators 402 and associated control systems 408, a plurality of conventional power generators 414 and associated control systems 415, a plurality of controllable loads 404, a grid control center 412, one or more renewable power control centers 432, and a load control center 416. In the example of FIG. 4, renewable power generators 402 include a plurality of types of renewable power generators, illustrated here as wind-based power generators 402a through 402c, and a solar-based power generator 402d.

Grid control center 412 may be configured to communicate with conventional power generator control systems 415 through a conventional power generator control network 418.

Renewable power control center 432 may be configured to communicate with renewable power generator control systems 408 through a renewable power generator control network 420.

Load control center 416 may be configured to communicate with controllable loads 404 through a load control network 406.

Load control center 416, grid control center 412, and renewable power control center 432, may be configured to communicate with one another through a grid control network 430. For example, renewable power control center 432 may be configured to receive indications of available power from renewable power generator control systems 408 through renewable power control network 420, and to provide corresponding aggregated indications of available power to load control center 416 through grid control network 430. Load control center 416 may be configured to receive load parameters from controllable loads 404 through load control network 406, to calculate load settings for one or more of controllable loads 404 in view of the aggregated indications of available power, and to communicate the load settings to the corresponding controllable loads 404 through load control network 406.

One or more features disclosed herein may be combined with one another and/or distributed across multiple platforms. For example, multiple renewable power control centers 432 may be integrated at a common control center or distributed over multiple control centers.

One or more renewable power control centers 432 may be integrated with load control center 416, such as to pre-balance loads with available renewable electrical energy. This may be implemented to aggregate renewable power and loads, which may be marketed as a package of excess renewable power generation including balancing and frequency regulation provided by the loads.

Conventional power generator control network 418 may be integrated with grid control network 430 as a combined grid control network, and one or more of renewable power control 432, load control center 416, and a combined renewable power and load control center may be connected to the combined grid control network.

Controllable loads 404 may include one or more PHEVs, illustrated here as PHEVs 404a, 404b, and 404c, and may include one or more other controllable loads, not PHEVs, illustrated here as controllable loads 404d and 404e.

Exemplary operation within environment 400 is described below with respect to controllable load 404a, illustrated here as a PHEV. When PHEV 404a is plugged in to a grid for charging, PHEV 404a may communicate with load control center 416 through load control network 406. PHEV 404a may communicate load information, such as minimum and maximum charging rates, $P_{min}$ and $P_{max}$, respectively, to load control center 416. Alternatively, PHEV 404a may communicate other load information to load control center 416, and load control center 416 may calculate $P_{min}$ and $P_{max}$ value. A setpoint value between the $P_{min}$ and $P_{max}$ values may be controllable, based on a corresponding charge state at reporting time, to ensure that by the end of a charging task time, the battery is charged.

Load control center 416 may aggregate load information from multiple loads, which may include one or more of PHEVs 404b and 404c and other controllable loads 404d and 404e. Load control center 416 may also aggregate load information from one or more other load control centers.

Load control center 416 may receive an indication of available power from one or more renewable power control centers 432 and may determine a corresponding desired sum load level, or it may receive an indication of the balance between generation and load in the grid from grid control center 412, or it may receive from grid control center 412 an allocation of a portion of the balance to be accommodated, or it may be assigned a desired sum load in some other way. Load control center 416 may coordinate with grid control center 412 in a variety of ways to determine the desired sum load level or portion of the balance to be accommodated.

Load control center 416 may determine a parameter associated with minimum and maximum charging rates of PHEVs 404a, 404b, and 404c, and the minimum and maximum task performance rates of other controllable loads 404d and 404e, in view of the desired sum load level, and communicate the parameters through load control network 406 to PHEVs 404a, 404b, and 404c, directly or through a PHEV communication network, individually and/or as a broadcast or multicast, and through load control network 406 to other controllable loads 404d and 404e individually or as a broadcast or multicast.

The parameters may include a set point between a corresponding set of $P_{min}$ and $P_{max}$ values. The parameters may include a percentage value "d" of a range between a corresponding set of $P_{min}$ and $P_{max}$ values, wherein a PHEV or another controllable load may determine a corresponding set point as $P_{min}+d*(P_{max}-P_{min})$.

Figure 5:
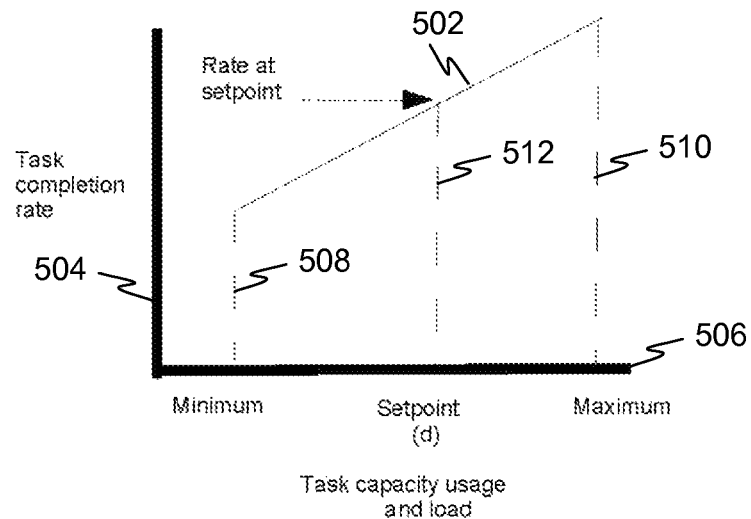
FIG. 5 is graphical illustration of an exemplary relationship between a task completion rate and task capacity usage and load, corresponding to a controllable load having a minimum rate and a maximum rate.

FIG. 5 is graphical illustration of an exemplary relationship 502 between a task completion rate 504 and task capacity usage and load 506, corresponding to a controllable load having a minimum task rate 508 and a maximum task rate 510. The graphical illustration of FIG. 5 includes an exemplary set point 512 determined as described herein.

Figure 6:
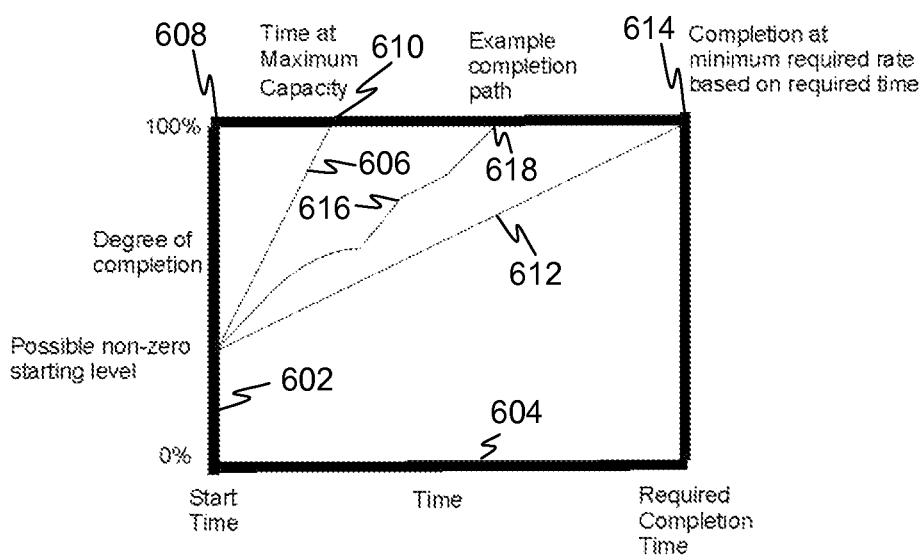
FIG. 6 is graphical illustration of exemplary relationships between a degree of completion and time for an exemplary controllable load or task and for a plurality of task performance rates.

FIG. 6 is graphical illustration of exemplary relationships between a degree of completion 602 and time 604, for an exemplary controllable load or task and for a plurality of task performance rates. A maximum rate path 606 corresponds to a maximum load value from a start time 608 to a completion time 610. A minimum rate path 612 corresponds to a minimum load value from start time 608 to a completion time 614. A controlled rate path 616 corresponds to a load value that is repeatedly adjusted between start time 608 and a completion time 618, as described herein.

Referring back to FIG. 2, load control system 216 may be configured and/or configurable in accordance with one or more of a plurality of features including, without limitation, a rate at which one or more load settings are determined, a rate at which one or more load settings are communicated, grouping of loads for purposes of determining load settings and/or communicating load settings, information flow in a load control network, allocation of computing functions, detection and/or determination of load grid disconnections, and communications protocols. Combinations of such features may be interrelated and may interact and/or impact one another, such as described below with respect to FIG. 7.

Figure 7:
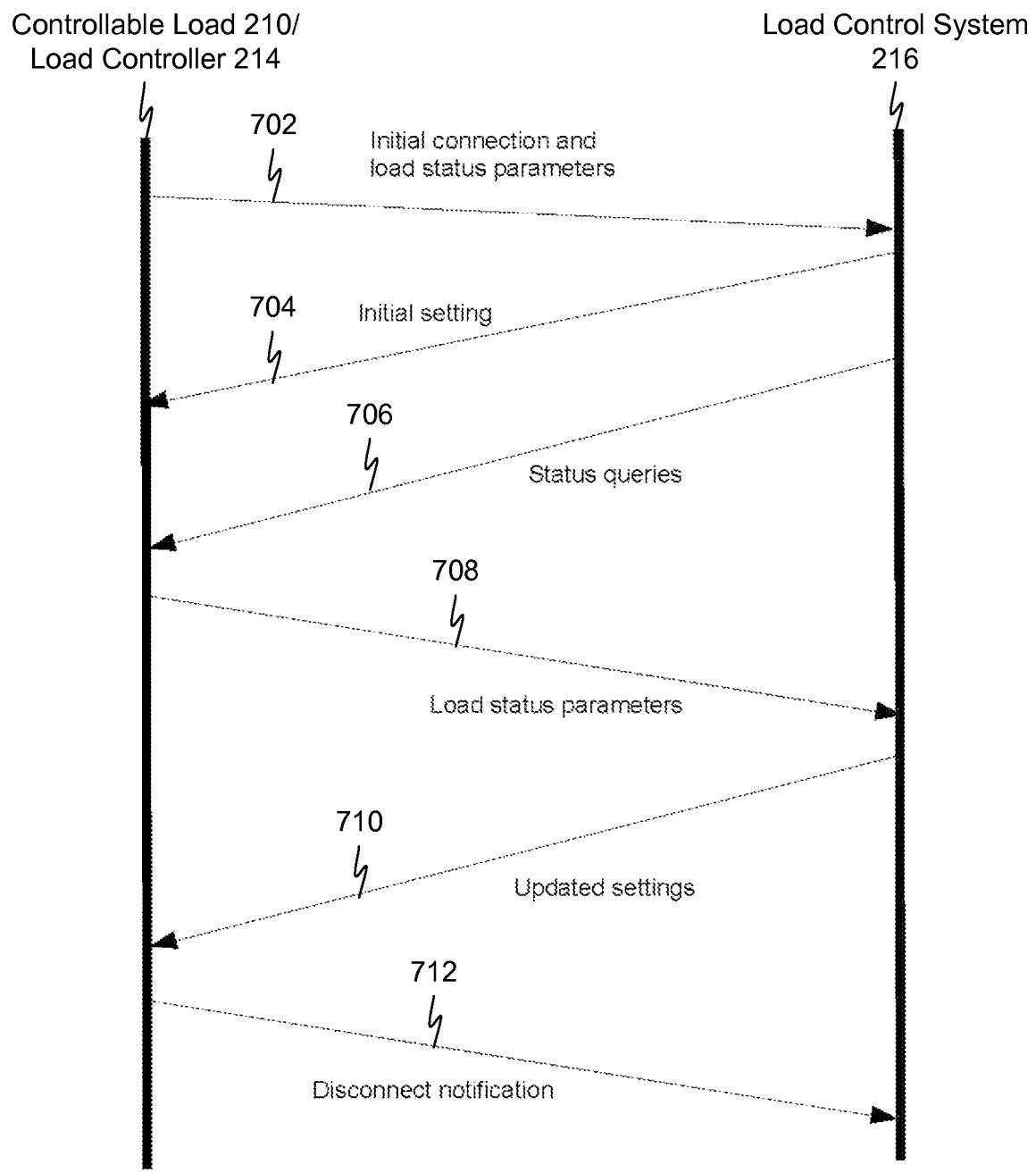
FIG. 7 is a graphical illustration of exemplary communications between the load control system and a controllable load.

FIG. 7 is a graphical illustration of exemplary communications between load control system 216 and a controllable load 210. When controllable load 210 connects to grid 206, a corresponding load controller 214 may establish communication with load control system 216. Load controller 214 may communicate initial connection and load information 702 to load control system 216. Load information 702 may include one or more parameters associated with task performance capabilities and task status.

In response, load control system 216 may determine and communicate one or more load settings 704 to controllable load 210 via load controller 214.

Thereafter, load control system 216 may communicate one or more updated load settings 710 to load controller load 214. Load control system 216 may be configured to communicate updated load setting 710 directly to load controller 214, and/or to broadcast or multicast one or more load settings to a plurality load controllers 214.

Load control system 216 may calculate load setting 710 in response to changes in the balance between available power and load, changes in available power, changes in a sum load, and/or in response to updated load information 708 received from load controller 214. Updated load information 708 may include updated load status parameters.

Load controller 214 may be configured to provide updated load information 708 without prompting from load control system 216, and/or may be configured to provide updated load information 708 in response to a status inquiry 706 from load control system 216. Load control system 216 may be configured to send status inquiries 706 to individual load controllers 214 and/or to poll a plurality of load controllers 214 with status inquiry 706.

Controllable load 210 may be subsequently disconnected from grid 206 (FIG. 2), and a corresponding disconnect notification 712 may be communicated to load control system 216. Grid disconnection notifications and estimation of grid disconnects are described further below.

Referring back to FIG. 2, an electrical power environment may include one or more of a variety of grid connection configurations and/or communication paths or channels.

For example, a controllable load 210 may be configured to connect to grid 206 permanently or semi-permanently, and the controllable load 210 and/or corresponding controller 214 may be configured to communicate with load control system 216 over a relatively permanent and/or fixed communication medium, such as a wireline, and may be configured to communicate as needed, on demand, on request, and/or continuously. Alternatively, or additionally, a controllable load 210 and/or corresponding controller 214 may be configured to communicate with load control system 216 over a wireless path or channel, and/or a combination of wireline and wireless.

A controllable load 210 may be configured to connect to grid 206 temporarily or for relatively short periods, such as a mobile controllable load, and the controllable load 210 and/or corresponding controller 214 may be configured to communicate with load control system 216 temporarily or for relatively short periods.

Communications between load control system 216 and a controllable load 210 and/or corresponding controller 214 may or may not be bound to a duration of connection between the controllable load 210 and grid 206. For example, a controllable load 210 and/or corresponding load controller 214 may be configured to begin exchanging information with load control system 216 substantially upon a grid connection, and may be configured to communicate with load control system 216 for at least a relatively limited period of time following a grid disconnect. This may permit controllable load 210 and/or corresponding controller 214 to report a grid disconnect to load control system 216.

For example, a controllable load 210 and/or corresponding controller 214 may be configured to communicate wirelessly with a fixed-position wireless transceiver that is in communication with load control system 216. Such a fixed-position wireless transceiver may be located proximate to a grid connection location, which may include one or more of a residence, commercial establishment, a road side service facility, and/or other location where a grid connection point or device may be located.

A controllable load 210 may be configured to connect to grid 206 through a grid connection device that is configured to communicate with load control system 216. Such a grid connection device may be configured to communicate with load control system 216 over one or more of a wireline and a wireless communication path, and may be configured to communicate a corresponding grid disconnection to load control system 206.

Grid disconnections are discussed further below.

Figure 8:
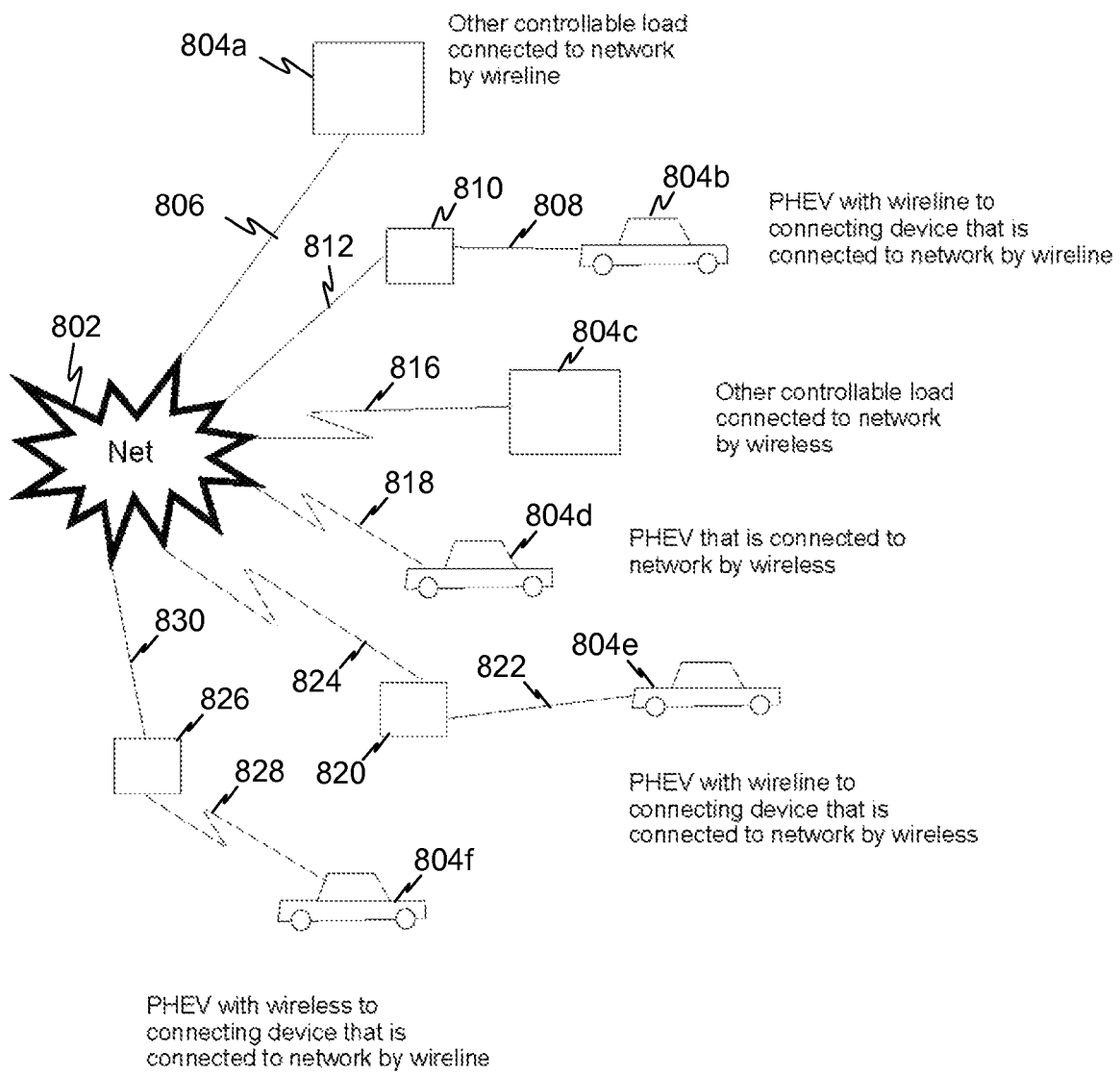
FIG. 8 is a block diagram of exemplary communications paths or channels between a load control network and a plurality of exemplary controllable loads.

FIG. 8 is a block diagram of exemplary communications paths between a load control network 802 and controllable loads 804a through 804f.

Controllable load 804a is configured to communicate with load control network 802 over a wireline connection 806.

Controllable load 804b includes a PHEV configured to communicate with load control network 802 through a wireline connection 808 to a connection device 810, and a wireline connection 812 between connection device 810 and load control network 802.

Controllable load 804c is configured to communicate with load control network 802 over a wireless path 816.

Controllable load 804d includes a PHEV configured to communicate with load control network 802 over a wireless path 818.

Controllable load 804e includes a PHEV configured to communicate with load control network 802 through a wireline connection 822 to a connection device 820, and a wireless path 824 between connection device 820 and load control network 802.

Controllable load 804f includes a PHEV configured to communicate with load control network 802 through a wireless path 820 to a connection device 826, and through a wireline connection 830 between connection device 826 and load control network 802.

One or more of connection devices 810, 820, and 826 may include and/or may be proximate to a grid connection device or point.

Referring back to FIG. 2, one or more loads 208 may disconnect from grid 206, which may impact available power and load balancing. Accordingly, the computing of load settings at 104 (FIG. 1) may include determining and/or estimating load disconnects from a grid. One or more controllable loads 210, corresponding load controllers 214, and connection devices, such as connection devices 810, 820, and 826 in FIG. 8, may be configured to communicate an indication of a corresponding load disconnect from grid 206. A grid disconnection communication procedure may include initiation, transmission, and confirmation of a disconnection message. Alternatively, or additionally, load control system 216 may be configured to determine and/or estimate loads 208 that disconnect from grid 206.

Where a controllable load 210 may disconnect from grid 206, and where the controllable load 210 communicates with load control system 216 or with a connection device over a wireless path, such as wireless paths 818 and 828 in FIG. 8, the controllable load 210 may be configured to report a grid disconnection to load control system 216.

Where grid disconnection results in loss of communication between a controllable load 210 and load control system 216, another device may be configured to report the grid disconnection. For example, where a controllable load 210 communicates with load control system 216 through a connection device, such as connection devices 810, 820, and 826 in FIG. 8, the connection device may be configured to report a grid disconnection to load control system 216.

Load control system 216 may be configured to determine grid disconnection in response to non-receipt of an expected report from a controllable load 210, and/or in response to a non-responsive polling of the controllable load 210.

Load control system 216 may be configured to estimate unreported grid disconnects when calculating controllable load settings, such as based on historic records of disconnects and/or other factors.

One or more features disclosed herein may be implemented in accordance with one or more of a variety communication standards and/or protocols, including, without limitation, International Electrotechnical Commission (IEC) standard IEC61850, corresponding to electrical substation or electric utility automation, and IEC standard IEC61400-25, corresponding to wind-power generation.

One or more features disclosed herein may be implemented in accordance with a North American Electric Reliability Corporation (NERC) standard, such as standard BAL-001-0a, titled, "Real Power Balancing Control Performance," such as where power is supplied by multiple renewable generation sources, and where load control performed with respect to a relatively large number of relatively small industrial, commercial, and/or residential loads.

For a PHEV controllable load 214, communications may be configured within and/or to support a vehicle to grid (V2G) environment. Use of PHEVs for providing ancillary services as V2G distributed generators is described in:

J. C. Smith, B. Parsons, et. al., "Best Practices in Grid Integration of Variable Wind Power: Summary of Recent US Case Study Results and Mitigation Measures," presented at the EWEC '07 Conference, Milan, Italy, May 2007; and W. Kempton and J Tomic, "Vehicle to grid power fundamentals: Calculating capacity and net revenue, "J. Power Sources, Volume 144, Issue 1, 1 Jun. 2005, Pages 268-279;

which are incorporated herein by reference in their entireties.

For illustrative purposes, IEC61850 standard is described below. Under IEC61850, a named object may be defined and communicated. The named object may be a hierarchical composite of other named objects, named attributes of the other named objects, and related attribute values. Power system equipment may be modeled using standardized objects. Object models may communicate using standardized services, such as GetData and SetData, mapped onto layered network communications technologies. Layering of these communication technologies may allow stack components to be modularly replaced with potentially improving functionality as technology and related standards advance. Each name in a 61850 (Edition 1) based system includes two parts. One part can be a name assigned by a user. The remainder may be a standardized name for the power system object. The power system object names can be extended to support new kinds of devices and additional information. The 61400-25 wind power standard has some parts that extend the 61850 standardized objects to include equipment and information needed for defining wind power facilities.

The use of named objects under IEC 61850 may provide one or more benefits in cost, security, and/or operations. Resulting systems may be easier to install and manage. Plug and play component discovery can be made feasible by the ability of devices to report information preloaded during installation, such as their location in the power system, as well as directories of their named objects. The flexibility in naming objects can simplify system upgrade. Access control policies can be easier to express and enforce. Object naming can increase the scope of operational information that can be potentially supported. The layering can allow use of a standard network infrastructure, which may reduce or eliminate point to point substation wiring and may enable the use of conventional security tools. Resulting systems can provide standard support for encryption and other security functions. Part 4 of IEC 61400-25 extends the communications technology supported by IEC 61850 to include widely available web services technology. Web services are a messaging method that piggybacks on common Internet protocols such as the Hypertext Transmission Protocol (http) used for the web. Implementation using web services makes a substantial amount of existing technology available to support wind power and load control applications.

Below is an IEC-61850 Naming Example:
Windfarm_unit_1_LB99A_CTRL/
MMXU1.PhV.phsB.CVal.mag.f
Where:
"Windfarm_unit_1_LB99A_CTRL" is a utility defined name for a monitoring and control device; and
MMXU1.PhV.phsB.CVal.mag.f is an IEC 61850 standard name for a floating point magnitude of the complex value that is the Phase B voltage measured by measurement unit (MMXU) number 1 of the device.

The following is a description of an exemplary dispatchable load control using the IEC-61850 utility automation standard. An IEC 61850 device may be modeled using structured data objects called Logical Nodes (LN). The LNs may be composed of Common Data Classes (CDC), which may be composed of Common Data Attributes (CDA), basic data types (that have numeric, logical, or text values), and/or other CDCs. The CDAs may be composed of basic data types.

The LN components may be Mandatory or Optional (M/O). The CDC components add Conditional (M/O/C). The CDA and basic data types have Functional Constraints (FC) that relate to their usage. FCs may include SP (setpoint), MX (measurement), CF (configuration data), DC (description) and EX (data model extension). The CDA and basic data types may also have report triggering options (TrgOp). TrgOp may include data change (dchg) and data quality change (qchg).

The example uses an LN constructed for dispatchable loads, named LDDC, and described below in the 61850 LN definition table format. (Names beginning with "L" are unused in the Edition 1 standard.) The example is based on objects available in 61850, Edition 1. Other CDCs may be defined and/or features may be altered to correspond to changes to IEC 61850.

TABLE 1

LN: Dispatchable Load Control (LDDC)
LDDC Class

| Attribute Name | Attribute Type | Explanation | M/O |
|---|---|---|---|
| Data | | LN shall inherit all Mandatory Data from (relevant to-be-determined) Common Logical Node Class | M |
| | | Common Information Status Information | |
| SysConn | SPS | Status of Power System Connection | M |
| DevCtrl | SPS | Device Available for Control | M |
| | | Analogue information | |
| SetPerfVal | APC | Task Performance Setpoint | M |
| TaskPerfVal | APC | Measured Task Performance Value | M |
| MinPerfRate | APC | Minimum Task Performance Rate | O |
| MaxPerfRate | APC | Maximum Task Performance Rate | O |
| TmToCmpl | MV | Time Remaining to Task Required Completion | O |
| TmCmplRq | APC | Time Task Completion is Required | O |

SPS (Single Point Status) and MV (Measured Value) CDCs can be found in 61850-7-3. Some of the parameters in MV are instMag and mag (the magnitude of the value instantaneously and to the accuracy of a specified deadband). For SPS one of the relevant parameters is stVal, the boolean status. The 61850 Common Data Class APC (Controllable Analogue Setpoint) may be structured as shown in Table 2.

TABLE 2

Controllable analogue set point information
(From Table 38, IEC 61850-7-3)
APC Class

| Attribute Name | Attribute Type | FC | TrgOp | Value/Value Range | M/O/C |
|---|---|---|---|---|---|
| DataName | | | Inherited from Data Class (See IEC 61850-7-2) | | |
| | | DataAttribute setpoint and measured attributes | | | |
| setMag | AnalogueValue | SP, MX | dchg | | M |
| Origin | Originator | SP, MX | | | O |

TABLE 2-continued

Controllable analogue set point information
(From Table 38, IEC 61850-7-3)
APC Class

| Attribute Name DataName | Attribute Type | FC | TrgOp | Value/Value Range | M/O/C |
|---|---|---|---|---|---|
| | | Inherited from Data Class (See IEC 61850-7-2) | | | |
| operTm | TimeStamp | SP | | | O |
| q | Quality | MX | qchg | | M |
| t | TimeStamp | MX | | | M |
| configuration, description and extension | | | | | |
| ctlModel | CtlModels | CF | | | M |
| units | Unit | CF | | Enumerated in 61850-7-3, Annex A | O |
| sVC | ScaledValueConfig | CF | | | AC_SCAV |
| minVal | AnalogueValue | CF | | | O |
| maxVal | AnalogueValue | CF | | | O |
| stepSize | AnalogueValue | CF | | 1 ... (maxV Al-minVal) | O |
| d | VISIBLE STRING255 | DC | | Text | O |
| dU | UNICODE STRING255 | DC | | | O |
| cdcNs | VISIBLE STRING255 | EX | | | AC_DLNDA_M |
| cdcName | VISIBLE STRING255 | EX | | | AC_DLNDA_M |
| dataNs | VISIBLE STRING255 | EX | | | AC_DLN_M |

Services (As defined in Table 37 of IEC 61850-7-3)

Where an implementation provides maximum and minimum capabilities of the load equipment, the parameters may be placed in the SetPerfVal.minVal and SetPerfVal.maxVal. If the minimum and maximum rates are calculated and set based on load equipment capabilities and time-to-complete the task, the values may be carried in MinPerfRate.setMag and MaxPerfRate.setMag. In either case, the setpoint value may be in SetPerfVal.setMag and the current value of the task performance may be TaskPerfVal.mag or TaskPerfVal.instMag.

In IEC 61850, a device is usually the server and a control center is typically the client. Dispatchable load control may involve modification of this arrangement to allow a controllable load 214 to initiate an exchange by alerting a control center or load control system 216 that is available for control.

For example, in FIG. 7, controllable load 210 may be configured to initially act as a 61850 client to contact load control system 216 and to transfer initial load information or parameters 702. Correspondingly, load control system 216 may be configured to initially act as a 61850 server. Thereafter, controllable load 210 may change roles to act as a 61850 server and load control system 216 may change roles to act as a 61850 client. The communication may then proceed in accordance with 704.

Alternatively, a controllable load 210 may be configured to use a non-IEC 61850 communication method to notify load control system 216 of its presence on the network. Load control system 216 may act as an IEC 61850 client to initiate 61850 communications, referred to as a 61850 "association," with the controllable load 210. Upon setup of the association, the controllable load 210 may send an unsolicited a 61850 Report to load control system 216 with its initial parameters. Alternatively, load control system 216 may send a 61850 GetDataValues service request to the controllable load 210 to request initial parameters from the controllable load 210. The communications may then proceed in accordance with 704 in FIG. 7.

Figure 9:
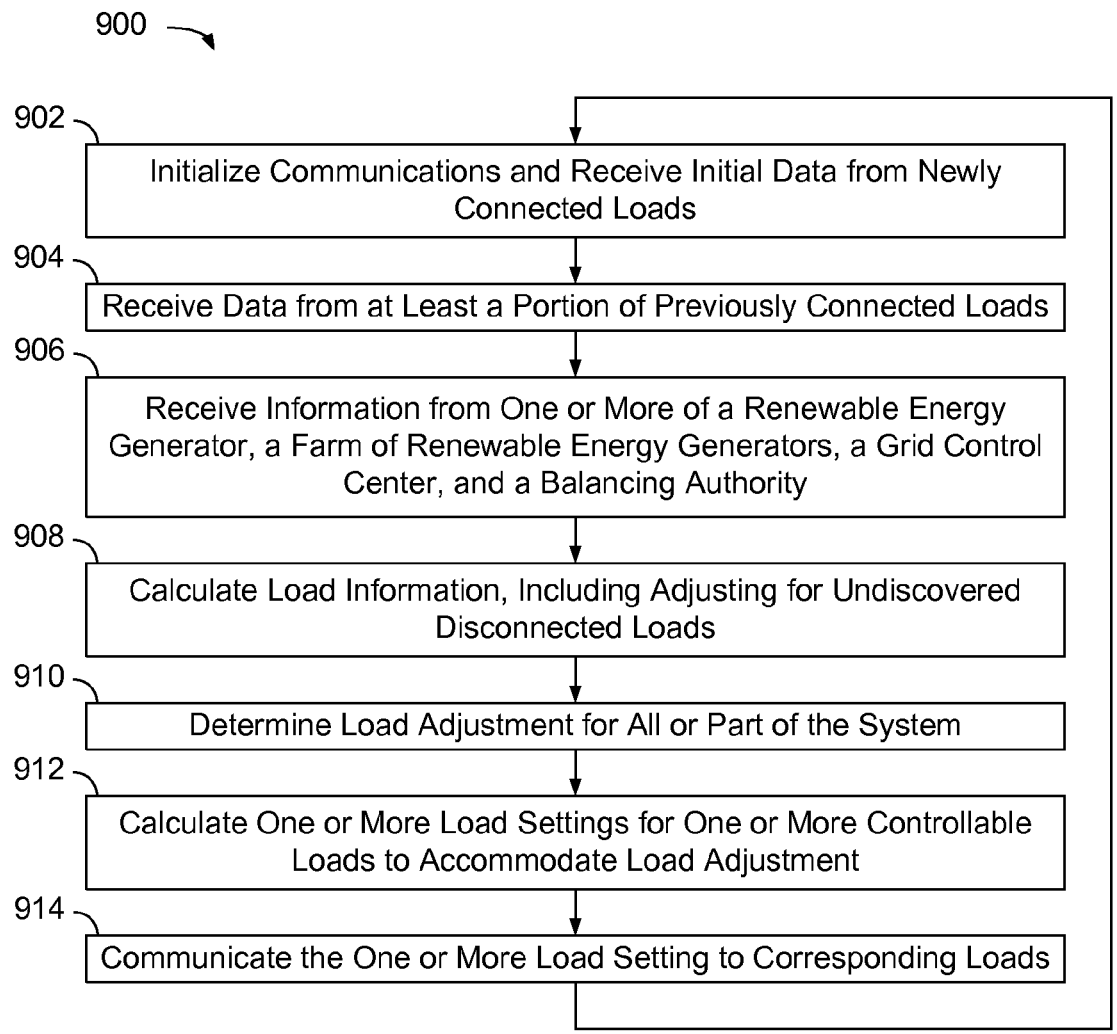
FIG. 9 is a process flowchart of another exemplary method of controlling load settings.

FIG. 9 is a process flowchart of an exemplary method 900 of managing load settings for a plurality of controllable loads.

At 902, communication is initialized with a first set of one or more controllable loads and initial data is received from the controllable loads.

At 904, load information is received from at least a portion of a second set of controllable loads for which communications were previously established.

At 906, one or more indications of balance between available power and load are received from one or more of a renewable energy generator, a farm of renewable energy generators, a renewable energy control center, a grid control center, and a balancing authority.

At 908, load information is calculated, including adjusting for one or more factors, which may include adjusting for unreported grid disconnects.

At 910, a load adjustment for all or part of the system is determined in accordance with the one or more indications of the balance between available power and loads and the load information.

At 912, one or more settings are determined for one or more controllable loads to accommodate the load adjustment.

At 914, the one or more settings are communicated to corresponding controllable loads. The communicating may include individually communicating to one or more controllable loads, and/or multicasting and/or broadcasting to a plurality of controllable loads.

One or more features disclosed herein may be implemented in hardware, software, firmware, and combinations thereof, including discrete and integrated circuit logic, application specific integrated circuit (ASIC) logic, and microcontrollers, and may be implemented as part of a domain-specific integrated circuit package, or a combination of integrated circuit packages. The term software, as used herein, refers to a computer program product including a computer readable medium having computer program logic stored therein to cause a computer system to perform one or more features and/or combinations of features disclosed herein.

Figure 10:
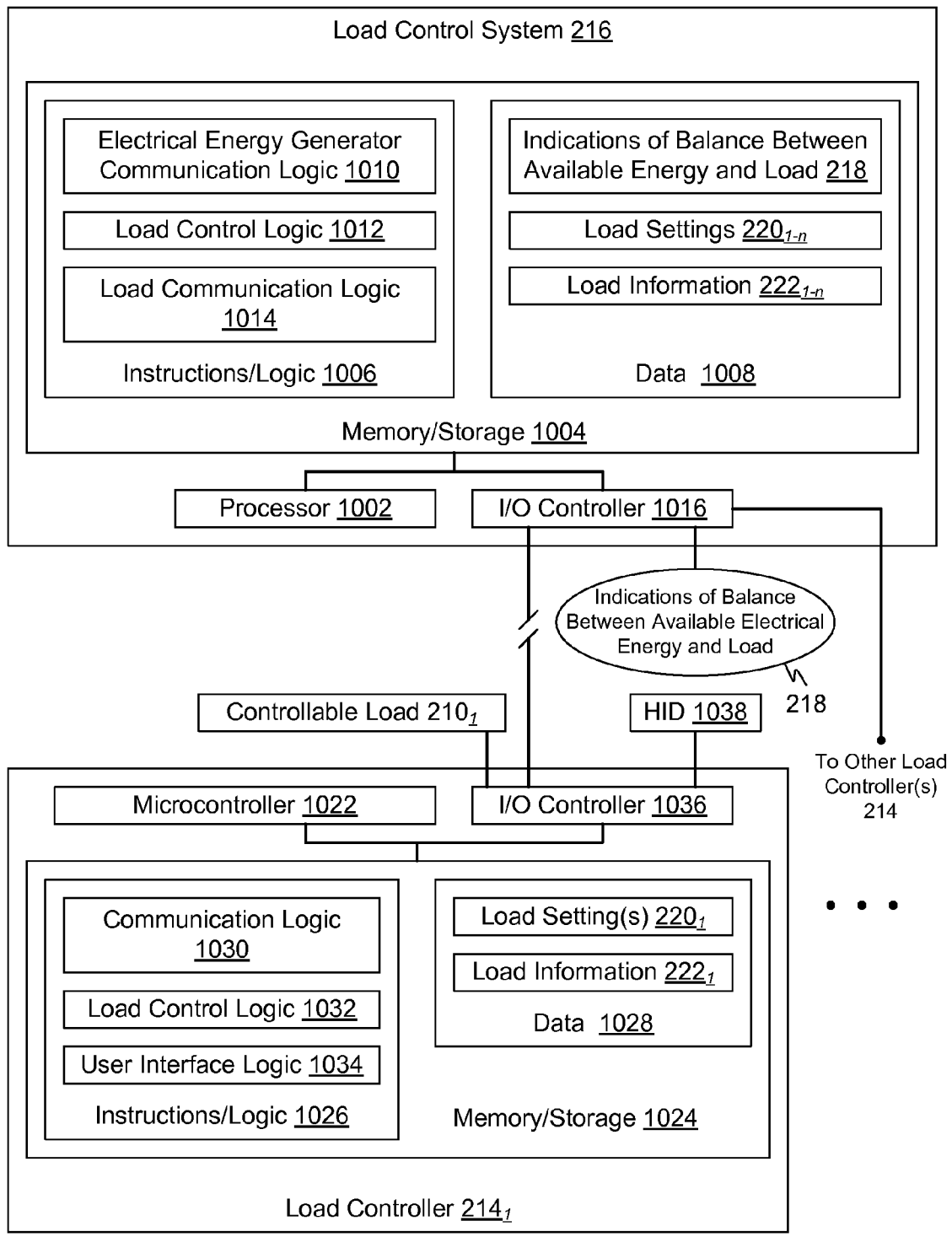
FIG. 10 is an exemplary block diagram of the load control system and a load controller.

FIG. 10 is an exemplary block diagram of load control system 216, controllable load 210₁, and load controller 214₁.

In the example of FIG. 10, load control system 216 includes one or more computer instruction processing units, illustrated here as a processor 1002, to execute computer program logic, also known as instructions, code, and software.

Load control system 216 includes memory/storage 1004, including a computer readable medium having computer program logic or instructions 1006 stored thereon, to cause processor 1002 to perform one or more functions in response thereto.

Memory/storage 1004 further includes data 1008 to be used by processor 1002 in executing logic 1006, and/or generated by processor 1002 in response to execution of logic 1006.

In the example of FIG. 10, logic 1006 includes electrical energy generator communication logic 1010 to cause processor 1002 to receive indications of balance 218 between available energy and loads from one or more generators 202 (FIG. 2) or grid control centers 312 or 412 or other sources of such information, as described above.

Logic 1006 further includes load control logic 1012 to cause processor 1002 to compute or determine load settings 220 for one or more controllable loads 210, as described above.

Logic 1006 further includes load communication logic 1014 to cause processor 1002 to communicate load settings 220 to corresponding loads 210, as described above.

Load communication logic 1014 may include logic to cause processor 1002 to receive load information 222 from loads 210, as described above.

Load control system 216 may include an input/output (I/O) controller 1016 to communicate with one or more electrical energy generators 202, grid control centers 312 or 412, other sources of information on the balance between available energy and loads, controllable loads 210, and/or load controllers 214. I/O controller 1016 may include one or more network interface cards (NICs) to communicate through one or more networks, as described above.

In the example of FIG. 10, load controller $214_1$ includes one or more computer instruction processing units, illustrated here as a microcontroller 1022, to execute computer program logic. Load controller further $214_1$ includes memory/storage 1024, including a computer readable medium having computer program logic or instructions 1026 stored thereon, to cause microcontroller 1022 to perform one or more functions in response thereto.

Memory/storage 1024 further includes data 1028 to be used by microcontroller 1022 in executing logic 1026, and/or generated by microcontroller 1022 in response to execution of logic 1026.

In the example of FIG. 10, logic 1026 includes communication logic 1030 to cause microcontroller 1022 to receive load setting(s) $220_1$ from load control system 216, as described above.

Communication logic 1030 may include logic to cause microcontroller 1022 to communicate load information $222_1$ to load control system 216, as described above.

Logic 1026 further includes load control logic 1032 to cause microcontroller 1022 to control load $210_1$ in response to load setting(s) $220_1$, as described above.

Logic 1026 may include user interface logic 1034 to cause microcontroller 1022 to receive one or more of information and programming instructions from a user through a human interface device (HID) 1038, which may include one or more of a keypad and a display.

Load controller $214_1$ may include an input/output (I/O) controller 1036, which may include one or more network interface cards (NICs), to communicate with load control system 216, as described above. I/O controller 1036 may be configured to communicate with HID 1038.

One or more features disclosed herein may be implemented on a single computer platform or may be distributed amongst multiple platforms at one or more geographic locations.

One or more features disclosed herein may be implemented with respect to, on behalf of, and/or under control of one or more of entities, which may include one or more of a balancing authority, a transmission operator, a reliability coordinator, and other entities involved in one or more of power generation, transmission, distribution, and management, and combinations thereof.

One or more features disclosed herein may be implemented to regulate loads.

One or more features disclosed herein may be implemented alone and/or in combination with one another, and/or in combination with one or more methods and systems to adjust the generation of electrical energy and/or to supplement renewable electrical production with other power sources.

Methods and systems are disclosed herein with the aid of functional building blocks illustrating the functions, features, and relationships thereof. At least some of the boundaries of these functional building blocks have been arbitrarily defined herein for the convenience of the description. Alternate boundaries may be defined.

One skilled in the art will recognize that these functional building blocks may be implemented by discrete components, application specific integrated circuits, processors executing appropriate software, and combinations thereof.

While various embodiments are disclosed herein, it should be understood that they have been presented by way of example only, and not limitation. It will be apparent to persons skilled in the relevant art that various changes in form and detail may be made therein without departing from the spirit and scope of the disclosure.

What is claimed is:

1. A machine-implemented method, comprising:

receiving indications of a balance in an electric grid between available electric power and load;

determining load settings within variable load ranges for a plurality of controllable loads that are controllable to operate within corresponding ones of the variable load ranges, based on load parameters of the controllable loads, to accommodate at least a portion of variations in the balance between available electric power and load, including one or more of, receiving minimum and maximum load values corresponding to a controllable load and determining a load setting for the controllable load as one or more of a plurality of parameters that in combination determine a load value and a rate of task performance, receiving a time parameter corresponding to a controllable load and repeatedly adjusting a load setting for the controllable load within a variable load range of the controllable load to meet an energy parameter of the controllable load in accordance with the time parameter while contributing to the balance between available electric power and loads on the grid, receiving minimum and maximum capacity values, a current state of a task, and a time parameter corresponding to a controllable load determine minimum and maximum load values based on one or more of the minimum and maximum capacity values, the current state of the task, and the time parameter, and determining a load setting for the controllable load as a set point within the minimum and maximum load values, and receiving product identification information corresponding to a controllable load from a corresponding load controller, retrieving one or more load parameters corresponding to the product identification information from one or more databases, and determining a load setting for the controllable load in accordance with the retrieved load parameters; and communicating the load settings to load controllers associated with the controllable loads to control the controllable loads with the corresponding load settings.

2. The method of claim 1 wherein the electric power grid includes one or more renewable electrical power sources coupled thereto, and wherein the determining load settings includes determining the load settings to accommodate variations in balance between the available renewable electric power and the load provided by the controllable loads and variations due to other factors.

3. The method of claim 1, wherein the indications of the balance include one or more of:
an indication of a system frequency;
an indication of an effect of generation or load changes on the change in system frequency;
an indication of an allocated portion of the balancing effort to be accommodated;
an indication of an allocated amount of controllable load to be changed;
an indication of an allocated amount of generation, the changes in which are to be balanced by changing the controllable loads;
an indication of a subset of the available generation, the changes in which are to be balanced at least in part by changing the controllable loads; and
an indication of a subset of the load, the changes in which are to be balanced at least in part by changing the controllable loads.

4. The method of claim 1, wherein the determining load settings further includes:
receiving minimum and maximum load values corresponding to a first controllable load and determining a load setting for the first controllable load as one or more of a plurality of parameters that in combination determine a load value and a rate of task performance.

5. The method of claim 1, wherein the determining further includes:
receiving a time parameter corresponding to a first controllable load and repeatedly adjust a load setting for the first controllable load within a variable load range of the first controllable load to meet an energy parameter of the first controllable load in accordance with the time parameter while contributing to the balance between available electric power and loads on the grid.

6. The method of claim 1, wherein the determining further includes:
receiving minimum and maximum capacity values, a current state of a task, and a time parameter corresponding to a first controllable load;
determining a minimum and maximum load values based on one or more of the minimum and maximum capacity values, the current state of the task, and the time parameter; and
determining a load setting for the first controllable load as a set point within the minimum and maximum load values.

7. The method of claim 1, wherein the determining further includes:
receiving product identification information corresponding to a first controllable load from a corresponding load controller;
retrieving one or more load parameters corresponding to the product identification information from one or more databases; and
determining a load setting for the first controllable load in accordance with the retrieved load parameters.

8. The method of claim 1, wherein the determining load settings further includes one or more of:
polling load controller, receiving an updated load parameter in response to the polling, and determining a load setting based on the updated load parameter;
receiving a load parameter by communications initiated at a load controller upon connection of a corresponding load to the grid;
receiving a load parameter by communications initiated at a load controller, as determined by the load controller based on a change in a value of the load parameter; and
receiving a load parameter by communications initiated at a load controller based on one or more reporting intervals jointly determined by communication between a load control system and the load controller, where each reporting interval includes one or more of a deterministic time interval and a random time interval.

9. The method of claim 1, further including performing one or more of the receiving, the determining, and the communicating at one or more time horizons.

10. The method of claim 1, further including performing one or more of the determining and the communicating at a first interval for a first subset of the controllable loads, and at another interval for another subset of controllable loads.

11. The method of claim 1, further including communicating with at least a portion of the load controllers using a layered network communications protocol.

12. The method of claim 1, further including communicating with at least a portion of the load controllers using an internet protocol and a web service.

13. The method of claim 1, further including computer modeling the controllable loads, including representing the controllable loads as data objects having data fields corresponding to one or more of,
grid connection status,
ability to vary load,
task performance setpoint,
measured task performance value,
minimum task performance rate,
maximum task performance rate,
load at maximum task performance rate,
load at minimum task performance rate,
a relationship between task performance rate and load, expressed as one or more of a mathematical function, an array of points, and a collection of parameters, to describe a function,
time remaining to task completion, and
target time of task completion.

14. A system, comprising a load control system to:
receive indications of balance in an electric grid between available electrical power and load;
determine load settings within variable load ranges for a plurality of controllable loads that are controllable to operate within corresponding ones of the variable load ranges, based on load parameters of the controllable loads, to accommodate at least a portion of variations in the balance between available electrical power and load, including one or more of,
poll a load controller, receive an updated load parameter in response to the polling, and determine a load setting based on the updated load parameter,
receive a parameter by communication initiated at a load controller upon connection of a corresponding load to the grid, receive a load parameter by communication initiated at a load controller, as determined by the load controller based on a change in a value of the load parameter, and receive a load parameter by communication initiated at a load controller based on one or more reporting intervals jointly determined by communication between the load control system and the load controller, where each reporting interval includes one or more of a deterministic time interval and a random time interval; and communicate the load settings to load controllers associated with the controllable loads to control the controllable loads with the corresponding load settings.

15. The system of claim 14, wherein the load control system is configured to communicate the load settings over a load controller network, and wherein the load control network includes one or more of:

a connection device that includes a wireline connector to connect to the load controller network and a connector to connect to one or more of a controllable load and a load controller;

a connection device that includes a wireless transceiver to wirelessly communicate with the load controller network, and a connector to connect to one or more of a load and a load controller;

a connection device that includes a wireline connector to connect to the load controller network and a wireless transceiver to wirelessly communicate with one or more of a load and a load controller; and a connection device that includes a wireless transceiver to wirelessly communicate with the load controller network and with one or more of a load and a load controller.

16. A machine-implemented method, comprising:

establishing communications between a load control system and a load controller associated with a controllable load that is controllable within a variable load range;

communicating one or more load parameters from the load controller to the load control system;

receiving a load setting within the variable load range at the load controller from the load control system in response to the one or more load parameters;

setting a load value of the controllable load by the load controller, within the variable load range in accordance with the received load setting;

communicating one or more updated load parameters from the load controller to the load control system;

receiving an updated load setting at the load controller from the load control system in response to the one or more updated load parameters; and adjusting the load value of the controllable load by the load controller, within the variable load range in accordance with the updated load setting.

17. The method of claim 16, wherein the communicating the load parameter includes:

initiating communication with the load control system by the load controller upon connection of the controllable load to an electric grid.

18. The method of claim 17, wherein the initiating communication includes:

initiating the communication under control of plug and play component discovery logic.

19. The method of claim 16, further including:

configuring one or more load parameters at the load controller in response to user input.

20. A non-transitory computer readable medium encoded with a computer program including instructions to cause a processor to:

establish communications with a load control system;

communicate one or more load parameters corresponding to a controllable load to the load control system, wherein the controllable load is controllable with respect to a variable load range;

receive a load setting from the load control system in response to the one or more load parameters;

set a load value of the controllable load within the variable load range and in accordance with the received load setting;

communicate one or more updated load parameters to the load control system;

receive an updated load setting from the load control system in response to the one or more updated load parameters; and adjust the load value of the controllable load within the variable load range in accordance with the load settings.

21. The computer readable medium of claim 20, wherein the instructions further include instructions to cause the processor to send task state information to the load control system.

22. A non-transitory computer readable medium encoded with a computer program including instructions to cause a processor to:

receive indications of a balance in an electric grid between available electric power and load;

determine a grid load adjustment value to accommodate at least a portion of the variation in balance between the available electric power and the load;

determine load settings within variable load ranges for a plurality of controllable loads that are controllable to operate within corresponding ones of the variable load ranges to correspond to the grid load adjustment value;

communicate the load settings to load controllers associated with the controllable loads to control the controllable loads with the corresponding load settings;

determine a variation in grid load due to one or more of controllable load grid connections and controllable load grid disconnections; and revise the grid load adjustment value to accommodate at least a portion of a variation in the balance between available electric power and the variation in the grid load.

23. The computer readable medium of claim 22, wherein the instructions to cause the processor to determine a variation in grid load include one or more of:

instructions to cause the processor to estimate controllable load grid disconnections; and instructions to cause the processor to estimate undiscovered controllable grid loads.

24. The method of claim 22, wherein the instructions to cause the processor to determine a variation in grid load include one or more of:

instructions to cause the processor to determine a controllable load disconnection in response to a non-responsive polling of a load; and instructions to cause the processor to determine a controllable load disconnection in response to non-receipt of a report due from a load controller.

* * * * *